United States Patent
Eleftheriadis et al.

(10) Patent No.: US 11,705,754 B2
(45) Date of Patent: **\*Jul. 18, 2023**

(54) METHOD AND DEVICES FOR OPTIMIZING BACKUP POWER CONTROL USING MACHINE LEARNING

(71) Applicant: TELEFONAKTIEBOLAGET LM ERICSSON (PUBL), Stockholm (SE)

(72) Inventors: Lackis Eleftheriadis, Gäavle (SE); Christofer Flinta, Stockholm (SE); Valentin Kulyk, Täby (SE); Konstantinos Vandikas, Solna (SE); Abhishek Sarkar, Bengaluru (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,514

(22) Filed: Jul. 5, 2022

(65) Prior Publication Data

US 2022/0337080 A1    Oct. 20, 2022

Related U.S. Application Data

(63) Continuation of application No. 17/260,328, filed as application No. PCT/EP2018/069633 on Jul. 19, 2018, now Pat. No. 11,418,053.

(51) Int. Cl.
*H02J 9/06* (2006.01)
*G06N 20/00* (2019.01)

(52) U.S. Cl.
CPC .............. *H02J 9/061* (2013.01); *G06N 20/00* (2019.01)

(58) Field of Classification Search
CPC ................. H02J 9/061; G06N 20/00

USPC .......................................................... 307/66
See application file for complete search history.

(56) References Cited

U.S. PATENT DOCUMENTS

| | | | |
|---|---|---|---|
| 10,048,996 B1 * | 8/2018 | Bell .................... | G06F 11/3006 |
| 10,432,017 B1 * | 10/2019 | Morales ............. | H02J 7/00712 |
| 2011/0101779 A1 | 5/2011 | Patel et al. | |
| 2012/0293002 A1 * | 11/2012 | Ye ............................ | H02J 9/06 429/61 |
| 2015/0244591 A1 | 8/2015 | Brown | |
| 2015/0264644 A1 | 9/2015 | Kamijoh et al. | |
| 2016/0209472 A1 * | 7/2016 | Chow .................. | G01R 31/367 |
| 2018/0054070 A1 * | 2/2018 | Krishnamoorthy ... | H02J 7/0068 |
| 2019/0312457 A1 * | 10/2019 | Li .......................... | G06N 3/006 |

OTHER PUBLICATIONS

International Search Report / Written Opinion dated Mar. 26, 2019 in related/corresponding PCT Application No. PCT/EP2018/069633.

* cited by examiner

*Primary Examiner* — Michael R. Fin
(74) *Attorney, Agent, or Firm* — Patent Portfolio Builders PLLC

(57) ABSTRACT

Methods and devices optimize backup power management for network devices connected to backup power sources including two different batteries. Machine learning techniques are used to predict upcoming power outages affecting the network device based on power-related historic information and current conditions. A backup-power operation plan prescribing usage of the backup power sources during the predicted power outages is then generated. The backup-power operation plan schedules a battery among the backup power devices to be used at least twice without being recharged.

25 Claims, 9 Drawing Sheets

(Background)

900

METHOD AND DEVICES FOR OPTIMIZING BACKUP POWER CONTROL USING MACHINE LEARNING

TECHNICAL FIELD

Embodiments of the subject matter disclosed herein relate to using machine learning (ML) techniques to develop a backup-power operation plan for using different backup sources to power a network device in case of electrical grid outages, so as to minimize recharging costs and the number of discharging/recharging cycles.

BACKGROUND

A network device (e.g., a radio base station, RBS, or all the hardware at one site) in a radio communication network is typically powered by the electric power grid and may have two or more different backup sources to be used if the grid becomes unavailable (i.e., power-grid outages are called simply "outages" hereinafter). The term "network device" encompasses all hardware that provides a core network's functionality and services.

Batteries are widely used as backup sources, with lead-acid batteries being the most common (and oldest) technology. Despite having a relatively low recharging efficiency of about 80% (i.e., only 80% of the energy spent for recharging the battery is stored), lead-acid batteries are inexpensive compared to batteries using newer technologies. Large-format lead-acid designs are frequently used for backup power supplies in cellphone towers. The latest versions of lead-acid batteries (e.g., gel-cells and absorbed glass-matt batteries) improve storage times and reduce maintenance requirements.

Another type of battery frequently used for network devices are lithium on batteries (using technology less than 30 years-old). This type of battery is more expensive per storage capacity, but more compact and has 97% recharging efficiency.

Batteries are not the only type of backup sources used by network devices. Backup generators and non-conventional sources of energy may also be employed.

Conventionally, a power controller switches between backup sources based on predefined rules. That is, when plural backup sources are available to power the network device during an outage, switching from one source to another is triggered when and if certain conditions are met (e.g., a threshold is exceeded). For example, if a battery and a diesel generator are the available backup sources, the available battery energy decreasing to 20% of its energy storage capacity triggers switching from the battery to the diesel generator.

FIG. 1 uses three related graphs (i.e., three graphs with the same horizontal time axis) to illustrate conventional power control. The top graph illustrates power supplied to the network device by two backup batteries during four outage periods: T1, T2, T3 and T4. T1, T2 and T3 last less than two hours each while T4 lasts more than four hours. The middle graph illustrates discharging (i.e., supplying the necessary power to the network device is represented as positive) and charging of the first battery (when outage is over power grid supplies the charging power represented as negative). The bottom graph illustrates discharging (i.e., supplying the necessary power to the network device) and charging of the second battery (the first and second battery being based on different technologies). In this case, the first battery is preferentially used (for example, because it is cheaper). Note that energy delivered is the product of power and time (the darker areas on the graph). As soon as the grid becomes available, the first battery is recharged. When, during the fourth power outage, T4, the first battery's available energy decreases below a predetermined threshold, the second battery starts being used.

This conventional approach is inefficient because it does not have the flexibility to take into consideration the battery's actual capability, which decreases over time. For example, a threshold of 20% of the battery's nominal capacity for switching is appropriate only for "healthy" batteries (i.e., batteries operating according to their nominal parameters). As the battery's capacity decreases, the 20% threshold becomes inappropriate.

Another disadvantage is that the conventional approach does not enable cost-efficient charging. In the fixed-rule approach illustrated in FIG. 1, batteries recharge as soon as the grid is back (i.e., the outage is over) although they may yet store substantial energy. On one hand, the cost of power may vary during the day, and, thus, recharging may occur at a peak time when the power price is high; therefore, recharging is more expensive than it needs to be. On the other hand, recharging the battery as soon as the grid is available as in the conventional approach triggers multiple discharging/recharging cycles, which degrade the battery faster, reducing the battery's "life" (i.e., period of usability). In the situation illustrated in FIG. 1, battery 1 was recharged four times. Frequent partial recharging is not necessary and should be avoided, particularly since the batteries can sustain deeper discharge before being recharged.

Conventional power control with predetermined rules and fixed thresholds is thus inefficient when two or more backup sources are available. In view of the above-identified problems, it has become desirable to improve power control in order to overcome the conventional approach's drawbacks and lower the costs.

SUMMARY

In order to improve backup power management when two or more different backup sources are available, methods based on machine learning, ML, are used to predict power outages based on historic information and current conditions. This prediction enables generating a backup-power operation plan which delays the recharging of a partially discharged battery used as backup source until the grid power price is more cost-effective. In other words, two or more portions of a battery's energy are used without recharging the battery, with the battery being discharged deeper, as long as it is foreseeable that the predicted backup power needs can be met by still-available backup capacity, which includes remaining energy in the partially-discharged battery.

According to an embodiment, there is a method for optimizing usage of the backup power supply of a network device in a radio communication network. The method includes predicting upcoming power outages using machine learning techniques, based on power-related historic information and current conditions. The method then includes generating a backup-power operation plan prescribing usage of backup power sources including two different batteries connected and configured to supply power to the network device during the predicted power outages. The backup-power operation plan schedules at least one of the batteries among the power sources to be used twice without being recharged. The network device receives backup power during outages according to the backup-power operation plan.

According to another embodiment, there is a network device including a communication interface and a data processing unit. The data processing unit is configured to perform at least one of (1) predicting upcoming power outages affecting the network device based on power-related historic information and current conditions, and (2) generating a backup-power operation plan prescribing usage of backup power sources including two different batteries connected and configured to supply power to the network device during the upcoming power outages. The data processing unit is also configured to control provision of power according to the backup-power operation plan during outages. The backup-power operation plan schedules at least one of the batteries among the backup power sources to be used twice without being recharged in-between.

According to yet another embodiment, there is a non-transitory computer-readable medium storing executable codes which, when executed by a computer, make the computer perform a method for optimizing usage of a backup power supply in a network device. The method includes predicting upcoming power outages using ML techniques, based on power-related historic information and current conditions, and generating a backup-power operation plan prescribing usage of backup power sources including two different batteries connected and configured to supply power to the network device during the predicted power outages. The backup-power operation plan schedules at least one of the batteries among the backup power devices to be used twice without being recharged in-between. The network device receives backup power during outages according to the backup-power operation plan.

According to yet another embodiment; there is a network device connected to backup power sources including at least two different batteries connected and configured to supply power to the network device during power outages. The network device includes a first module configured to predict upcoming power outages using ML techniques, based on power-related historic information and current conditions, a second module configured to generate a backup-power operation plan prescribing usage of the backup power sources during the predicted power outages, and a third module configured to monitor and control the backup power sources to provide backup power according to the backup-power plan when outages occur. Here also, the backup-power operation plan schedules at least one of the batteries among the backup power devices to be used twice without being recharged in-between.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments are related to backup power control and are described in the context of a radio communication network.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or functions may be combined in any suitable manner in one or more embodiments.

Various embodiments described in this section optimize backup power operations when two or more backup sources including different batteries are connected to a network device. Machine learning, ML, techniques are used to predict upcoming outages. At least one battery among the backup sources is used more than once without recharging so as to minimize recharging cost and the number of discharging/recharging cycles.

Figure 2:
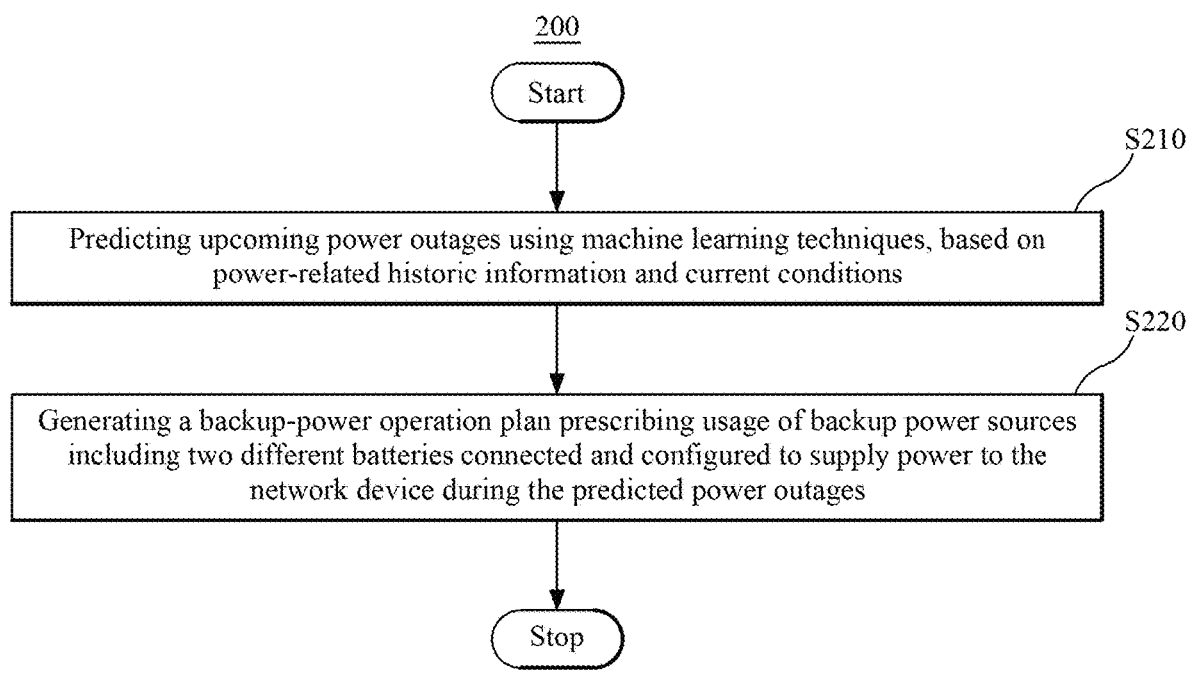
FIG. 2 is a flowchart of a backup power control method according to an embodiment.

FIG. 2 is a flowchart of a method 200 for optimizing usage of a backup power supply of a network device in a radio communication network according to an embodiment. Method 200 includes predicting upcoming power outages using ML techniques, based on power-related historic information and current conditions at 210.

The power-related historic information may include:
1) date, time of day and duration of past power outages,
2) the evolution of the network device's load (i.e., the network device's power level as a function of time), and
3) previous outage prediction performance for similar conditions.

The current conditions may include:
1) P=power currently used (i.e., current load);
2) tday=time of day (as outages are more likely during peak hours);
3) tweek=day of the week (as grid reliability may differ on weekends versus work days);
4) tyear=date, i.e., time of year (as outages can relate to season);
5) current weather; and
6) weather prediction (which may be obtained using some network weather service).

Various ML techniques may be employed to predict future power outages and their duration. ML algorithms such as LSTM (Long Short-Term Memory) and deep neural networks may be used.

Another ML technique that may be used is learning a classification model for the probability of a power outage during a future time interval (e.g., the next four hours). This ML technique may use as input a number and duration of outages that have occurred during a time interval similar to the future time interval and similar conditions. The output of this ML technique is a prediction of one (or more) upcoming power outage(s) during the future interval, with a specific probability (e.g., a 95% probability to have one outage during the next four hours). A similar approach may be used for predicting likelihood (i.e., a probability) of no outage occurring in the future time interval.

Regression is another example of an ML technique that may be employed for predicting upcoming outages. Regression predicts time (and optionally duration) of an upcoming outage based on the same input as the classification. The regression's output may include a confidence interval around the prediction.

The power outage occurrence may also be modeled as an arrival process. The arrival process is a form of stochastic process with random events that follow, as an assembly, a certain distribution. For example, if modeled according to a Poisson distribution, the time intervals between power outages are exponentially distributed. Other distributions of the time intervals may be used. Modeling may output an expected time of the next outage within some bounds.

Figure 3:
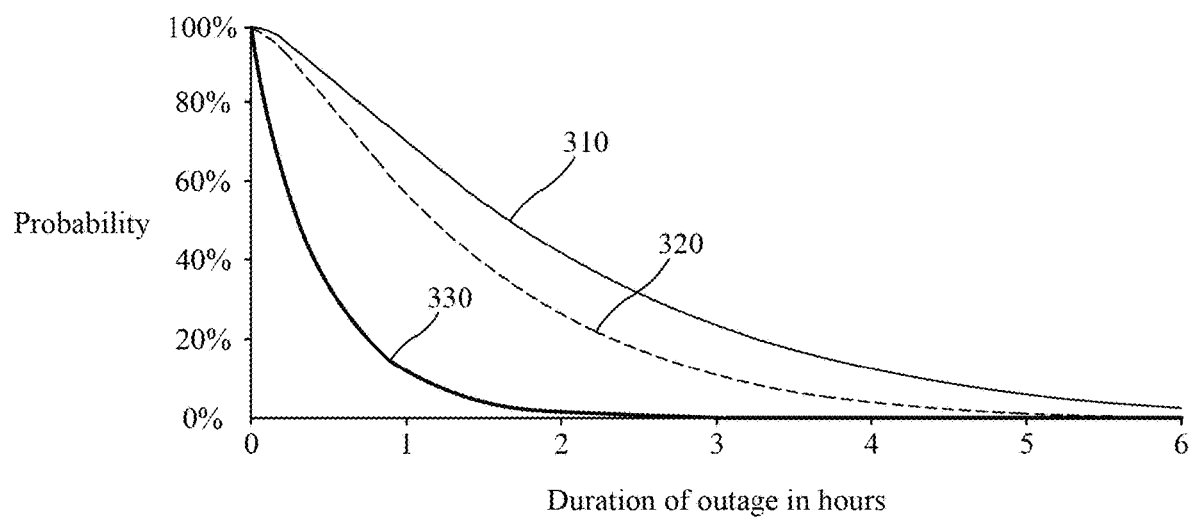
FIG. 3 is a graph of probability versus duration usable in modeling outages according to an embodiment.

In addition to the expected times of upcoming outages, duration of the outages may also be modeled according to a probability distribution as illustrated by the probability versus duration graph in FIG. 3. Curve 310 corresponds to a network device for which long-lasting power outages are very likely, curve 320 corresponds to another network device for which long-lasting power outages are moderately likely, and curve 330 corresponds to yet another network device for which long-lasting power outages are unlikely.

Returning now to FIG. 2, method 200 further includes generating a backup-power operation plan prescribing usage of backup power sources including two different batteries connected and configured to supply power to the network device during the predicted power outages at S220. By "different" batteries here it should be understood different type of technologies such as a lead-acid battery and a lithium-ion battery. The backup-power operation plan schedules at least one of the batteries to be used twice or more times without being recharged between uses. That is, the battery is used in portions/packages. The outage prediction enables assertion that the network device's future power needs can be met by the energy available in the backup power sources even if the battery has been partially discharged.

Unlike the conventional method in which a battery was recharged as soon as grid power became available, in view of the prediction, the recharging may be delayed until the discharge becomes deeper, thus minimizing the number of discharging/recharging cycles. In other words, repeated use of the battery without recharging is planned as if the battery capacity is split into packages to be used one at a time during an outage. Delaying the recharging also allows scheduling this operation when the grid power price is low. A battery power counter may be used to monitor battery charging state.

The backup-power operation plan may use current information about the backup power sources, including one or more of power, maximum stored energy and recharging efficiency for each of the batteries. This approach has the flexibility of taking into consideration the actual (and not nominal) backup sources' parameters, flexibility which was missing in the conventional approach.

Thus, the backup-power operation plan includes not only instructions related to the backup power sources used during power outages (which one and for how long), but also battery recharging instructions. These recharging instructions indicate recommended time and estimated duration of recharging for each of the batteries and are generated based on, for example: individual recharging efficiency (e.g., 80% for lead-acid batteries and 97% for lithium-ion batteries), predicted grid availability, cost of the grid power, predicted power outages, etc.

Figure 1:
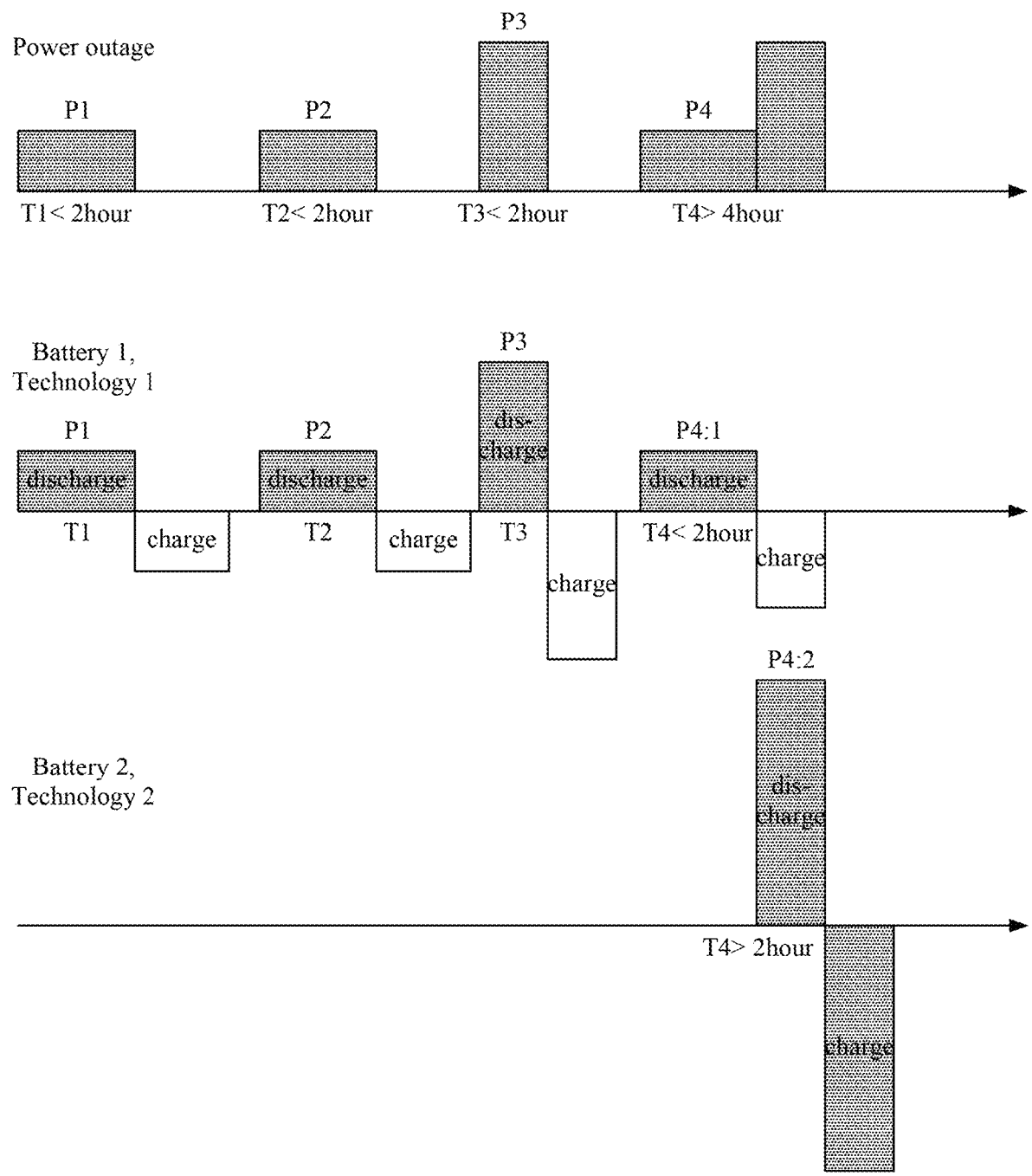
FIG. 1 illustrates backup power control according to the conventional approach.
Figure 4:
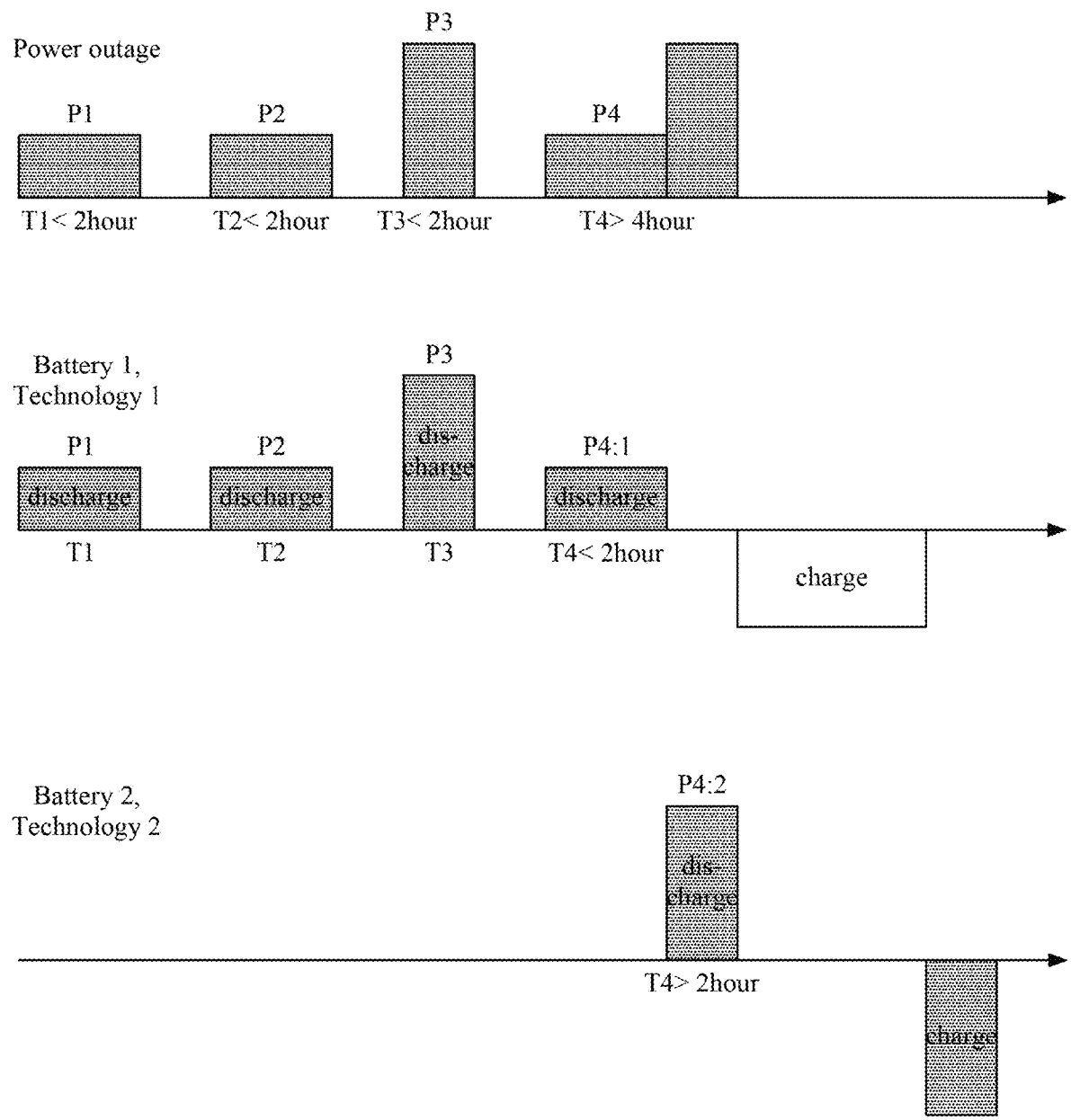
FIG. 4 illustrates backup power control according to an embodiment.

FIG. 4 uses three related graphs similar to the ones in FIG. 1 to illustrate backup power control according to an embodiment. The top graph is the same as the one in FIG. 1, showing the power supplied by the two batteries to the network device during four outage periods: T1-T4 (with T1, T2 and T3 lasting less than two hours each and T4 lasting more than four hours). The middle graph illustrates discharging and charging of the first battery, and the bottom graph illustrates discharging and charging of the second battery. In this case, the first battery is partially used during all four outage periods, for example, until its energy storage capacity decreases below a predetermined threshold (e.g., a predefined percentage of its energy storage capacity). The first battery is thus used plural times without being charged. During the fourth power outage, T4, the second battery is used as a backup source for the last portion of the fourth outage. Unlike the conventional approach, the first battery is here recharged only one time, and it is not recharged using the second battery's power.

Figure 5:
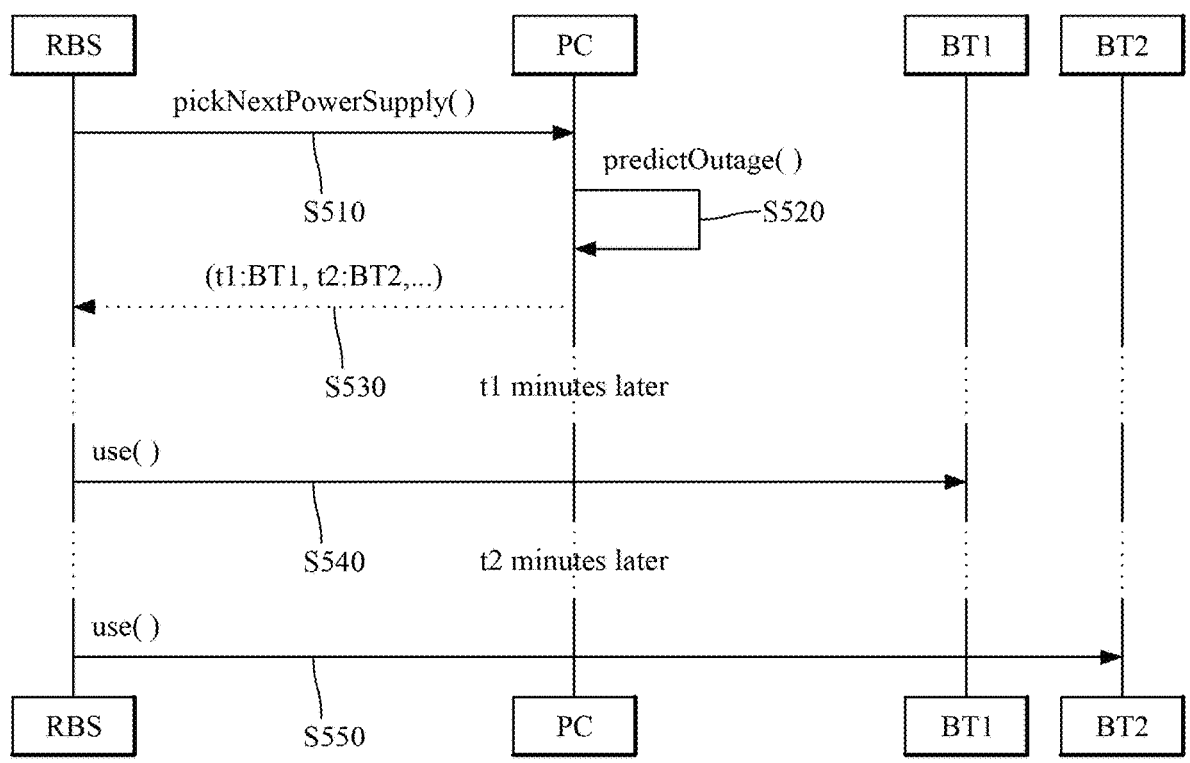
FIG. 5 illustrates backup power management according to an embodiment.

FIG. 5 illustrates backup power management according to an embodiment. The network device (labeled RBS) prompts the power controller, PC, to provide a backup-power operation plan at S510. The power controller may be collocated with the network device or at another location. The power controller predicts upcoming outages and generates the backup-power operation plan at S520. Then, at S530, the power controller sends the plan to the network device. The plan includes instructions such as: use the first battery, BT1, at starting time t1, and switch to using the second battery, BT2, at time t2. Thus, when an outage occurs after t1 but before t2, the network device uses the first battery as a backup power source at S540, and, if an outage occurs after t2, the network device uses the second battery as a backup power source at S550.

The methods according to various embodiments described in this section may be executed periodically and/or "on demand." For example, the method may be performed every day and generate a backup-power operation plan for the following 24 hours or it may refer to peak hours only. Alternatively or additionally, certain events may trigger executing the method. For example, the method may be executed if the weather forecast indicates conditions making outages more likely, or if instability of the electric grid is observed. Even if there is a backup-power operation plan spanning a current time period, if the backup power source monitoring indicates departure from the expected stored energy exceeding a safe margin, the method may be reiterated to take into consideration such current conditions.

Figure 6:
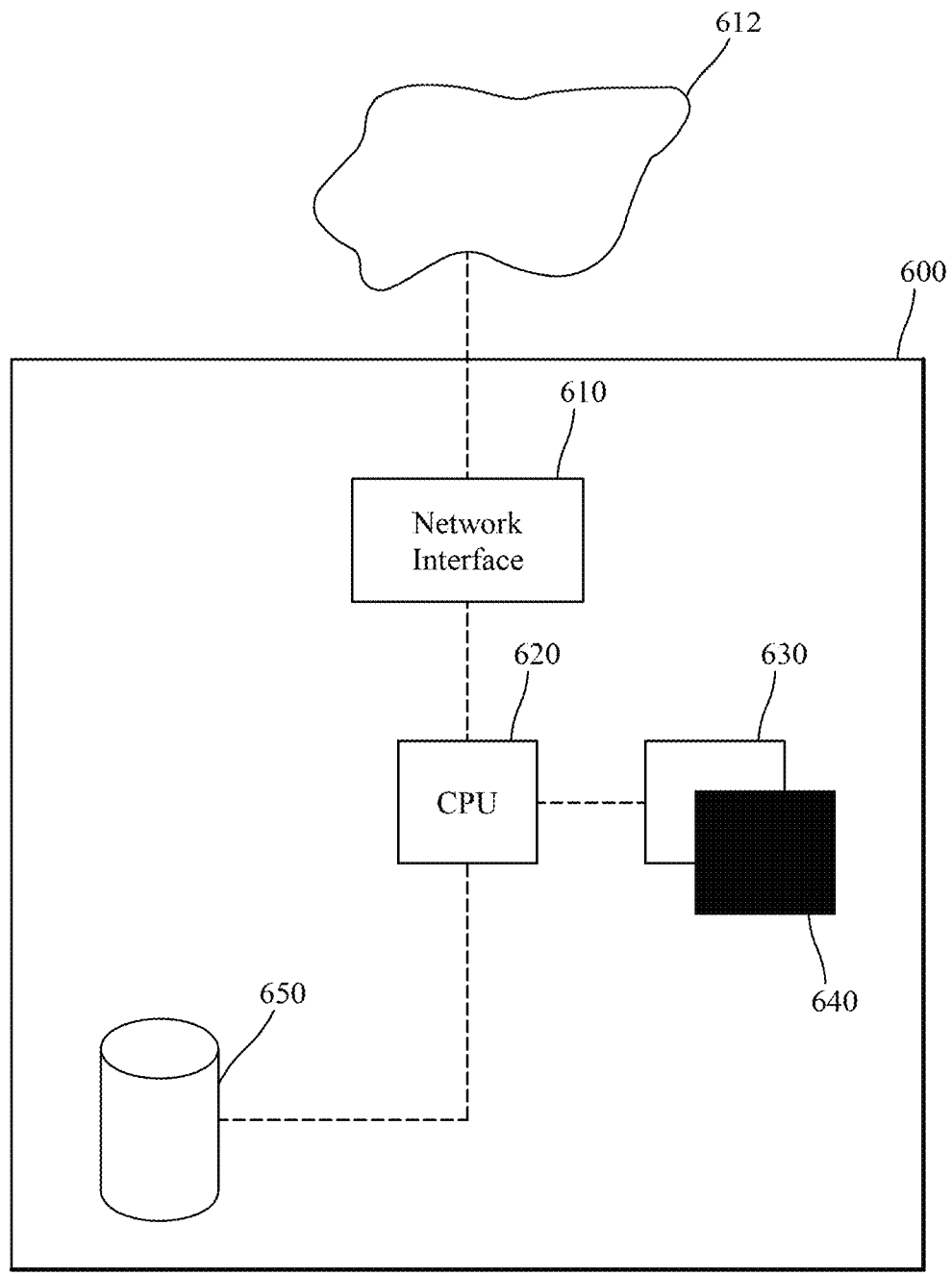
FIG. 6 illustrates a network device according to an embodiment.

FIG. 6 illustrates a network device 600 according to an embodiment. Network device 600 is configured to execute backup power control functionality of incorporated backup power sources 630 and 640, one of which is a battery. Network device 600 has a network interface 610 connecting it to the radio communication network 612, and a central processing unit (CPU) 620 connected to interface 610 and including at least one processor. CPU 620 is also connected to the backup power sources and to a data storage device 650.

CPU 620 is configured to predict upcoming power outages affecting the network device based on power-related historic information and current conditions, and to generate a backup-power operation plan prescribing usage of backup power sources 630 and 640. CPU 620 is also configured to control the backup power sources to provide power during outages. The backup-power operation plan schedules a battery among the backup power source to be used at least twice without being recharged in-between.

The CPU may retrieve the power-related historic information and information about the backup sources from data storage device 650 or from another location via network 612. Information related to the current conditions may be obtained from sensors and counters or obtained using network services.

Figure 7:
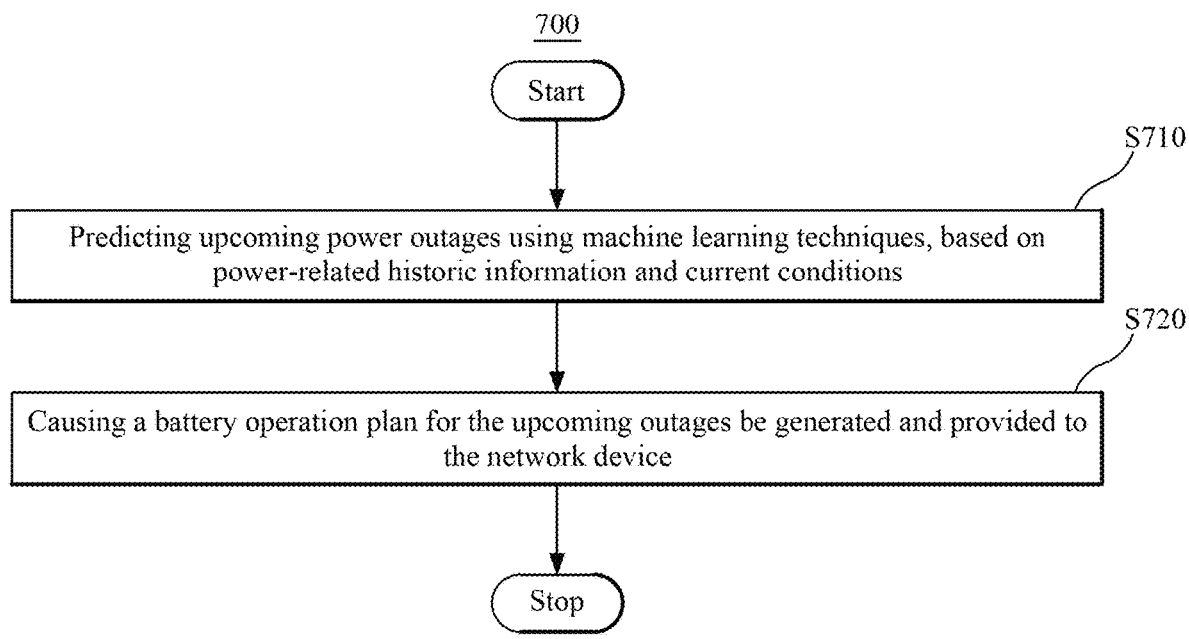
FIG. 7 is a flowchart of a method optimizing usage of a backup power supply according to an embodiment.
Figure 8:
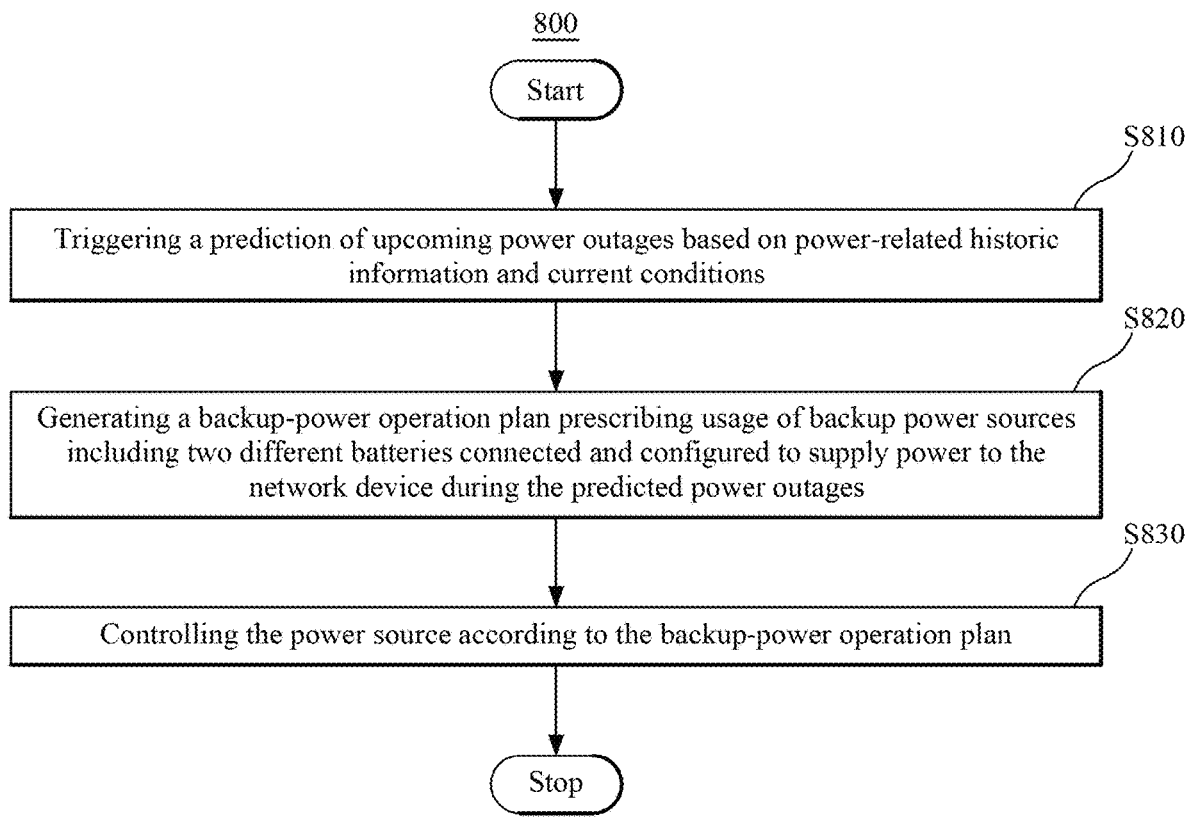
FIG. 8 is a flowchart of another method optimizing usage of a backup power supply according to an embodiment.

As already mentioned, predicting upcoming power outages and generating a backup-power operation plan may be performed at different locations in the network. FIG. 7 is a flowchart of a method 700 performed by first hardware that predicts the upcoming outages using machine learning techniques, based on power-related historic information and current conditions at S710 and causes second hardware to generate the battery operation plan for the upcoming power outages at S720. FIG. 8 is a flowchart of another method 800 performed by first hardware that triggers second hardware to predict the upcoming power outages based on power-related historic information and current conditions at S810 and generates the backup-power operation plan prescribing usage of at least two different power sources connected and configured to supply power to the network device during the predicted power outages at S820. The power source is controlled according to the back-up power operation plan at S830. Either of first and second hardware may be collocated with the network device and may control the backup sources to provide power (and recharge) according to the backup-power operation plan.

Figure 9:
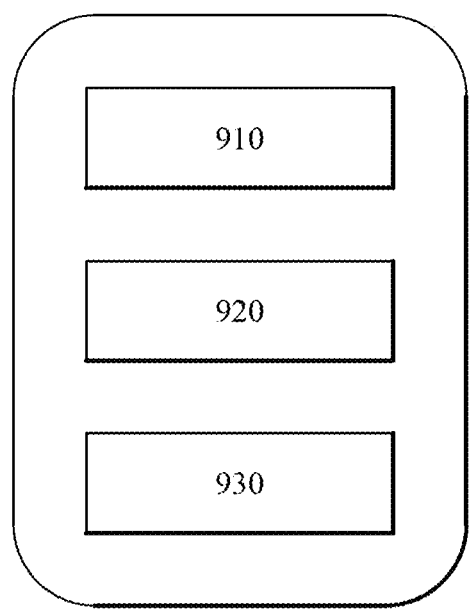
FIG. 9 is an apparatus optimizing usage of a backup power supply according to an embodiment.

According to yet another embodiment illustrated in FIG. 9, a controller 900 includes hardware and software of three modules 910, 920 and 930. First module, 910, is configured to predict upcoming power outages using machine learning techniques, based on power-related historic information and current conditions. Second module, 920, is configured to generate a backup-power operation plan prescribing usage of at least two different power sources connected and configured to supply power to the network device during the predicted power outages. Third module, 930, is configured to monitor and control the power sources to provide backup power to the network device according to the backup-power plan.

The above-described embodiments have at least some of the following advantages. Predicting outages using machine learning techniques enables efficient selection of backup sources to better match requirements with needs. By deferring recharging a battery used as a backup power source and performing fewer discharging/charging cycles, battery life is extended. By delaying recharging until the price of grid power is lower, operation cost is reduced.

The embodiments disclosed in this section provide methods and network devices for optimizing backup power control for network devices with backup power sources including different batteries. This description is not intended to limit the invention. On the contrary, the exemplary embodiments are intended to cover alternatives, modifications and equivalents, which are included in the scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments with particular combinations thereof, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for optimizing usage of backup power supply of a network device in a radio communication network, the method comprising:
    predicting upcoming power outages using machine learning techniques, based on power-related historic information and current conditions; and
    generating a backup-power operation plan based on the predicted upcoming power outages, the backup-power operation plan prescribing usage of backup power sources including two different batteries connected and configured to supply power to the network device during the predicted power outages, wherein
    the predicting of the upcoming power outages includes modeling the upcoming power outages as an arrival process with a distribution,
    the backup-power operation plan comprises battery recharging instructions and schedules at least one of the batteries among the backup power sources to be used at least twice without being recharged, and
    the network device receives backup power during outages according to the backup-power operation plan that is based on the predicted upcoming power outages.

2. The method of claim 1, wherein the backup-power operation plan is generated using current information about the backup sources including one or more of power, maximum stored energy and recharging efficiency for each of the batteries.

3. The method of claim 1, wherein the battery recharging instructions comprises a recommended time and a duration of recharging for each of the batteries.

4. The method of claim 1, wherein the power-related historic information includes one or more of past outage times, dates and durations, network device's past power usage as a function of time, and previous outage prediction performance for similar conditions.

5. The method of claim 1, wherein the current conditions include one or more of: current load, time of the day, day of the week, date, current weather, and predicted weather.

6. The method of claim 1, wherein the backup-power operation plan spans a predetermined time interval and specifies order and duration of using each of the backup power sources.

7. The method of claim 1, wherein the battery recharging instructions are determined so as to minimize both recharging cost based on recharging power cost as function of time of day and a number of discharging/recharging cycles for the batteries.

8. The method of claim 1, wherein at least one of the predicting and the generating are executed by hardware in the radio communication network other than the network device.

9. The method of claim 1, wherein at least one piece of information related to the current conditions is retrieved using a network service.

10. A network device, including a communication interface and a data processing unit, wherein the network device is configured to perform at least one of
   predicting upcoming power outages affecting the network device based on power-related historic information and current conditions; and
   generating a backup-power operation plan based on the predicted upcoming power outages, the backup-power operation plan prescribing usage of backup power sources including two different batteries connected and configured to supply power to the network device during the upcoming power outages, and to control provision of power during outages according to the backup-power operation plan that is based on the predicted upcoming power outages, wherein
   the predicting of the upcoming power outages includes modeling the upcoming power outages as an arrival process with a distribution,
   the backup-power operation plan comprises battery recharging instructions and schedules at least one of the batteries among the backup power devices to be used at least twice without being recharged, and
   the network device receives backup power during outages according to the backup-power operation plan that is based on the predicted upcoming power outages.

11. The network device of claim 10, wherein the backup-power operation plan is generated using current information about the backup power sources including one or more of power, maximum stored energy and recharging efficiency for each of the batteries.

12. The network device of claim 10, wherein the battery recharging instructions comprises a recommended time and a duration of recharging for each of the batteries.

13. The network device of claim 10, wherein the power-related historic information includes one or more of past outage times, dates and durations, network device's past power usage as a function of time, and previous outage prediction performance for similar conditions.

14. The network device of claim 10, wherein the current conditions include one or more of: current load, time of the day, day of the week, date, current weather, and predicted weather.

15. The network device of claim 10, wherein the backup-power operation plan spans a predetermined time interval and specifies order and duration of using each of the backup power sources.

16. The network device of claim 10, wherein the recharging instructions are determined so as to minimize both recharging cost based on recharging power cost as function of time of day and a number of discharging/recharging cycles for the batteries.

17. The network device of claim 10, wherein one of the predicting and the generating are executed by hardware in the radio communication network outside the network device.

18. The network device of claim 10, wherein at least one piece of information related to the current conditions is retrieved using a network service.

19. A non-transitory computer readable medium storing executable codes which, when executed by a computer make the computer perform a method for optimizing usage of backup power supply in a network device, the method comprising:
   predicting upcoming power outages using machine learning techniques, based on power-related historic information and current conditions; and
   generating a backup-power operation plan based on the predicted upcoming power outages, the backup-power operation plan prescribing usage of backup power sources including two different batteries connected and configured to supply power to the network device during the predicted power outages, wherein
   the predicting of the upcoming power outages includes modeling the upcoming power outages as an arrival process with a distribution,
   the backup-power operation plan comprises battery recharging instructions and schedules at least one of the batteries among the backup power devices to be used at least twice without being recharged, and
   the network device receives backup power during outages according to the backup-power operation plan that is based on the predicted upcoming power outages.

20. The method of claim 1, wherein the distribution is a Poisson distribution.

21. The method of claim 1, wherein the arrival process is a form of stochastic process.

22. The method of claim 1, wherein the different batteries are implemented with two different types of battery technologies.

23. The network device of claim 10, wherein the distribution is a Poisson distribution.

24. The network device of claim 10, wherein the arrival process is a form of stochastic process.

25. The network device of claim 10, wherein the different batteries are implemented with two different types of battery technologies.

* * * * *

UNITED STATES PATENT AND TRADEMARK OFFICE
CERTIFICATE OF CORRECTION

PATENT NO. : 11,705,754 B2
APPLICATION NO. : 17/857514
DATED : July 18, 2023
INVENTOR(S) : Eleftheriadis et al.

Page 1 of 1

It is certified that error appears in the above-identified patent and that said Letters Patent is hereby corrected as shown below:

On the Title Page

In Item (72), under "Inventors", in Column 1, Line 1, delete "Gäavle" and insert -- Gävle --, therefor.

In the Specification

In Column 1, Line 36, delete "lithium on" and insert -- lithium-ion --, therefor.

In Column 1, Line 62, delete "represented" and insert -- is represented --, therefor.

In Column 3, Line 33, delete "embodiment;" and insert -- embodiment, --, therefor.

In the Claims

In Column 9, Line 10, in Claim 10, delete "perform at least one of" and insert -- perform --, therefor.

Signed and Sealed this
Twenty-seventh Day of February, 2024

Katherine Kelly Vidal
*Director of the United States Patent and Trademark Office*